(12) United States Patent
Kotha et al.

(10) Patent No.: US 8,693,485 B2
(45) Date of Patent: Apr. 8, 2014

(54) VIRTUALIZATION AWARE NETWORK SWITCH

(75) Inventors: Saikrishna Kotha, Austin, TX (US); Gaurav Chawla, Austin, TX (US); Hendrich M. Hernandez, Round Rock, TX (US); Jacob Cherian, Austin, TX (US); Robert L. Winter, Leander, TX (US)

(73) Assignee: Dell Products, LP, Round Rock, TX (US)

( * ) Notice: Subject to any disclaimer, the term of this patent is extended or adjusted under 35 U.S.C. 154(b) by 1010 days.

(21) Appl. No.: 12/579,107

(22) Filed: Oct. 14, 2009

(65) Prior Publication Data

US 2011/0085563 A1 Apr. 14, 2011

(51) Int. Cl.
H04L 12/28 (2006.01)

(52) U.S. Cl.
USPC .......................................... 370/409; 370/254

(58) Field of Classification Search
None
See application file for complete search history.

(56) References Cited

U.S. PATENT DOCUMENTS

| | | | |
|---|---|---|---|
| 7,194,538 B1 | 3/2007 | Rabe et al. | |
| 7,313,637 B2* | 12/2007 | Tanaka et al. | 710/8 |
| 7,328,260 B1 | 2/2008 | Muthiyan et al. | |
| 7,401,338 B1 | 7/2008 | Bowen et al. | |
| 7,403,987 B1 | 7/2008 | Marinelli et al. | |
| 7,484,208 B1 | 1/2009 | Nelson | |
| 7,506,040 B1 | 3/2009 | Rabe et al. | |
| 7,836,332 B2* | 11/2010 | Hara et al. | 714/5.11 |
| 7,949,638 B1* | 5/2011 | Goodson et al. | 707/655 |
| 8,027,354 B1* | 9/2011 | Portolani et al. | 370/431 |
| 8,054,832 B1* | 11/2011 | Shukla et al. | 370/389 |
| 8,134,922 B2* | 3/2012 | Elangovan et al. | 370/230.1 |
| 8,195,774 B2* | 6/2012 | Lambeth et al. | 709/220 |
| 8,213,336 B2* | 7/2012 | Smith et al. | 370/254 |
| 8,230,069 B2* | 7/2012 | Korupolu | 709/226 |
| 8,301,686 B1* | 10/2012 | Appajodu et al. | 709/201 |
| 8,387,060 B2 | 2/2013 | Pirzada et al. | |
| 2003/0217123 A1* | 11/2003 | Anderson et al. | 709/219 |
| 2004/0187106 A1* | 9/2004 | Tanaka et al. | 718/1 |
| 2006/0184937 A1* | 8/2006 | Abels et al. | 718/1 |
| 2007/0104119 A1* | 5/2007 | Sarkar et al. | 370/254 |
| 2007/0180436 A1 | 8/2007 | Travostino et al. | |
| 2007/0283348 A1 | 12/2007 | White | |
| 2008/0172492 A1* | 7/2008 | Raghunath et al. | 709/229 |
| 2008/0205377 A1* | 8/2008 | Chao et al. | 370/351 |
| 2009/0067442 A1* | 3/2009 | Killian | 370/401 |
| 2009/0204965 A1* | 8/2009 | Tanaka et al. | 718/1 |
| 2009/0327392 A1* | 12/2009 | Tripathi et al. | 709/201 |
| 2009/0327462 A1* | 12/2009 | Adams et al. | 709/222 |
| 2010/0061391 A1* | 3/2010 | Sindhu et al. | 370/412 |
| 2010/0074175 A1* | 3/2010 | Banks et al. | 370/328 |
| 2010/0131636 A1* | 5/2010 | Suri et al. | 709/224 |

(Continued)

*Primary Examiner* — Bunjob Jaroenchonwanit
(74) *Attorney, Agent, or Firm* — Larson Newman, LLP

(57) ABSTRACT

A network switch includes a port coupled to a host, and a profile. The profile includes a key associated with a virtual machine on the host, and information for configuring the port for the virtual machine. The switch receives communication on another port with the key and configures the other port for the virtual machine. A method includes coupling a host with a virtual machine to a port of a network switch, receiving communications from the virtual machine on the port, and creating a profile with a key for identifying data associated with the virtual machine and with information for configuring the switch to route data associated with the virtual machine through the port, receiving communications with the key information at another port, and modifying the information to route data for the virtual machine through the other port.

20 Claims, 4 Drawing Sheets

(56) References Cited

U.S. PATENT DOCUMENTS

| | | | |
|---|---|---|---|
| 2010/0165877 A1* | 7/2010 | Shukla et al. | 370/254 |
| 2010/0169467 A1* | 7/2010 | Shukla et al. | 709/220 |
| 2010/0169948 A1* | 7/2010 | Budko et al. | 726/1 |
| 2010/0214949 A1* | 8/2010 | Smith et al. | 370/254 |
| 2010/0287548 A1* | 11/2010 | Zhou et al. | 718/1 |
| 2011/0019678 A1* | 1/2011 | Mehta et al. | 370/401 |
| 2011/0035498 A1* | 2/2011 | Shah et al. | 709/226 |
| 2011/0058547 A1* | 3/2011 | Waldrop et al. | 370/389 |
| 2011/0085560 A1* | 4/2011 | Chawla et al. | 370/401 |
| 2011/0085563 A1* | 4/2011 | Kotha et al. | 370/401 |
| 2011/0246669 A1* | 10/2011 | Kanada et al. | 709/238 |
| 2011/0255538 A1* | 10/2011 | Srinivasan et al. | 370/392 |
| 2012/0011240 A1* | 1/2012 | Hara et al. | 709/223 |

* cited by examiner

VIRTUALIZATION AWARE NETWORK SWITCH

FIELD OF THE DISCLOSURE

This disclosure relates generally to information handling systems, and relates more particularly to network switching in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems. An information handling system can include virtual machines that run operating systems and applications on a common host system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

Figure 1:
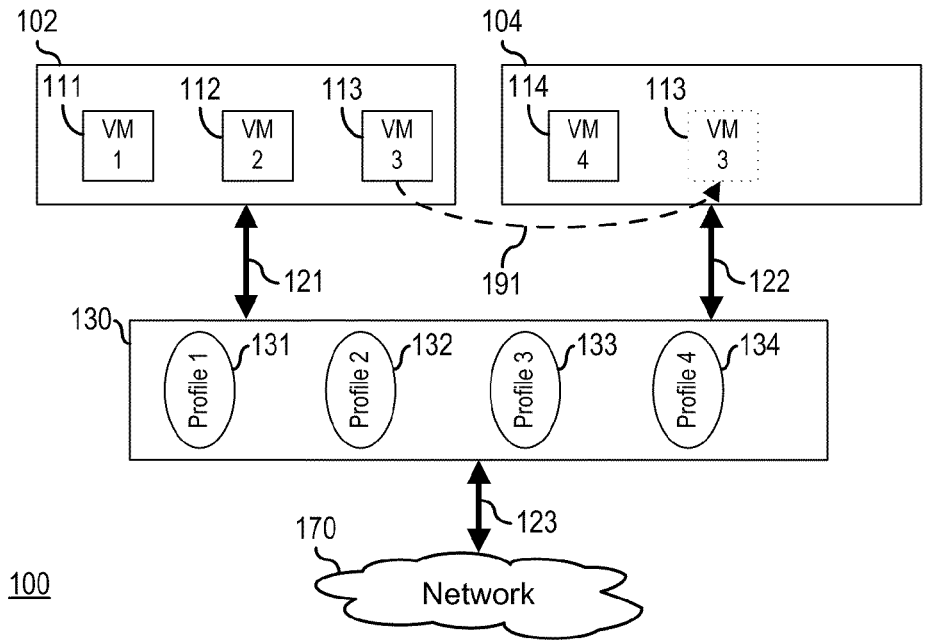
FIG. 1 is an illustration of a network system including a virtualization aware network switch according to an embodiment of the present disclosure.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile such as random-access memory), nonvolatile such as read-only memory or flash memory) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as various input and output (I/O) devices such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

FIG. 1 illustrates a network system 100 according to an embodiment of the present disclosure, including a host processing system 102, one or more additional host processing systems 104, a virtualization aware network switch 130, and a network 170. Host processing system 102 is connected to network switch 130 by port 121, host processing system 104 is connected to network switch 130 by port 122, and network switch 130 is connected to network 170 by port 123. Network switch 130 and ports 121, 122, and 123 are associated with a particular network switching fabric. For example, network switch 130 can be an Ethernet switch, an iSCSI aware Ethernet switch, a Fibre Channel over Ethernet aware switch, a Fibre Channel switch or another network switching fabric. Ports 121, 122, and 123 each represent one or more data communication links between the elements connected thereto. Network 170 represents devices and resources that are available to host processing systems 102 and 104, and that are accessible through network switch 130. For example, network 170 can include one or more storage area networks (SAN), connectivity to other information handling systems, other devices or resources, or a combination thereof.

Host processing systems 102 and 104 each include a virtual machine manager (VMM, not illustrated). The VMM enables hardware and software virtualization on the host processing system, such that one or more virtual machines can be instantiated on the particular host processing system. Thus, the VMM permits a host processing system to run multiple operating systems, including different operating systems (OSs), multiple instances of the same OS, or a combination of multiple OSs and multiple instances of a particular OS. The VMM creates and deletes virtual machines on the host processing system, and, working in combination with the VMMs in other host processing systems, migrates virtual machines between host processing systems. Virtual machines can be created, deleted, or migrated in order to better utilize the processing resources of host processing systems 102 and 104, to balance workloads between host processing systems 102 and 104, or to provide a more fault tolerant and reliable processing environment. Host processing system 102 includes virtual machines (VMs) 111, 112, and 113, and host processing system 104 includes VM 114. Host processing systems 102 and 104 can each include additional virtual machines (not illustrated).

VMs 111, 112, and 113 obtain access to network 170 via port 121, network switch 130, and port 123, and VM 114 obtains access to network 170 via port 122, network switch 130, and port 123. Information communicated through network switch 130 is identifiable as to the source and the destination of the information so that network switch 130 can correctly route the information. For example, if a storage device on network 170 is sending data to VM 113, then network switch 130 will identify VM 113 as the target of the data, and send the data to VM 113 by routing the data to port 121. Therefore, in order to correctly route information, network switch 130 is configured with information whereby network switch 130 knows that VM 113 is on host processing system 102. Moreover, when VM 113 is migrated to host processing system 104, as indicated by dashed line 191, then network switch 130 is re-configured such that network switch 130 knows that VM 113 is on host processing system 104, and should no longer route communications between VM 113 and network 170 via port 121. Instead, after migration, network switch 130 routes communications between VM 113 and network 170 via port 122.

In a particular embodiment, when VMs 111, 112, 113, and 114 are created on host processing system 102 or 104, then a network administrator (not illustrated) creates a corresponding profile 131, 132, 133, and 134 on network switch 130, such that profile 131 corresponds with VM 111, profile 132 corresponds with VM 112, profile 133 corresponds with VM 113, and profile 134 corresponds with VM 114. Each profile 131 through 134 includes a key with which each profile 131 through 134 identifies communications to and from the corresponding VM 111 through 114. The key in each profile 131 through 134 can include a media access control (MAC) address associated with corresponding VM 111 through 114, a Fibre Channel world-wide name (WWN) associated with corresponding VM 111 through 114, an iSCSI qualified name (IQN-id) associated with corresponding VM 111 through 114, or a user defined identifier that is associated with the corresponding VM 111 through 114. When network switch 130 receives communications from host processing system 102 or 104, network switch 130 analyzes the communication to determine the source of the communication. When the source of the communication matches the key in one of profiles 131 through 134, network switch 130 associates the corresponding profile with the ports 121, 122 or 123 through which the communication traveled.

Profiles 131 through 134 also include information used to configure network switch 130 for the associated VMs 111 through 114. For example, profiles can include a virtual local area network (VLAN) identifier for the associated virtual machine, a virtual machine priority or quality-of-service policy for the associated virtual machine, access control list (ACL) rules associated with the virtual machine, mirroring policy information for the associated virtual machine, or other configuration information used by a network switch to establish route mappings between virtual machines and the associated resources and devices in a network. Thus, profiles 131 through 134 includes network configuration information for newly created VM 111 through 114, including which port 121 or 122 is used to access each VM 111 through 114.

In another embodiment, when VMs 111 through 114 are created on host processing system 102 or 104, then network switch 130 automatically creates a corresponding profile 131, 132, 133, or 134. Here, when network switch 130 receives communications from host processing systems 102 or 104 that include an unrecognized key, such as an unrecognized MAC address, WWN, IQN-id, or user defined identifier, then network switch 130 creates a new profile 131, 132, 133, or 134, including on which port 121 or 122 the unrecognized communication was received. Other configuration information in the automatically created new profile 131, 132, 133, or 134 can be set-up with predefined default parameters, such as a default VLAN identifier, a default virtual machine priority or quality-of-service policy, default ACL rules, default mirroring policy information, or other default configuration information.

When a particular VM 111, 112, 113, or 114 is migrated to a different host processing system 102 or 104, then network switch 130 automatically reconfigures itself with the proper routing information to accommodate the migration. In the illustrated example, VM 113 is migrated from host processing system 102 to host processing system 104. Before migration, VM 113 is associated with profile 133 that includes a key that identifies communications to and from VM 113. The key can include a MAC address for VM 113, a WWN or IQN-id for VM 113, or a user defined identifier that is associated with VM 113. Profile 133 also identifies port 121 as the appropriate route to VM 113.

After migration, VM 113 attempts to communicate with devices or resources on network 170 via port 122. When network switch 130 receives communications with the key associated with VM 113 via port 122, network switch 130 recognizes that these communications previously associated with port 121 are henceforth to be associated with port 122. Thus network switch 130 applies the network configuration specified by profile 133 to the network port 122, and removes this network configuration from port 121. This reflects the fact that VM 113 is now resident on host processing system 104, and that subsequent communications to and from VM 113 are to be associated with port 122. In this way, a virtualization aware network switch can automatically change network configuration when a VMM migrates virtual machines from one host processing system to another, without necessitating manual network reconfiguration by a network administrator.

Figure 2:
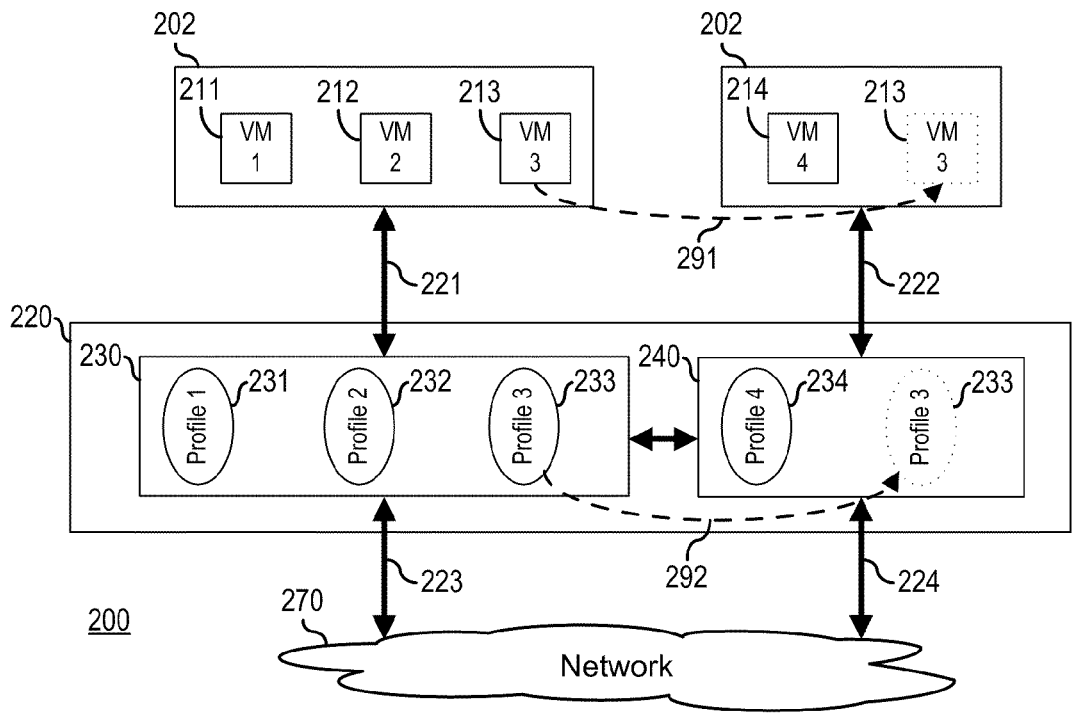
FIG. 2 is an illustration of a network system including another embodiment of a virtualization aware network switch.

FIG. 2 illustrates a network system 200, similar to network system 100, according to another embodiment of the present disclosure. Network system 200 includes a host processing system 202, one or more additional host processing systems 204, a stackable switch 220, and a network 270. Stackable switch 220 includes a virtualization aware network switch 230 and one or more additional virtualization aware network switches 240. Host processing system 202 is connected to network switch 230 by port 221, host processing system 204 is connected to network switch 240 by port 222, network switch 230 is connected to network 270 by port 223, and network switch 240 is connected to network 270 by port 224. Network switch 230 is connected to network switch 240 for the exchange of information, including the exchange of profiles 231, 232, 233, and 241, as described below. Network switch 230 and ports 221 and 223 are associated with a particular network switching fabric, and ports 221 and 223 each represent one or more data communication links between the elements connected thereto. Similarly, network switch 240 and ports 222 and 224 are associated with a particular network switching fabric that can be different from the network switching fabric associated with network switch 230. Ports 222 and 224 each represent one or more data communication links between the elements connected thereto. Network 270 represents devices and resources that are available to host processing systems 202 and 204, and that are accessible through network switch 130.

Host processing system 202 includes VMs 211, 212, and 213, and host processing system 204 includes VM 214. Host processing systems 202 and 204 can each include additional virtual machines (not illustrated). VMs 211, 212, and 213 obtain access to network 270 via port 221, network switch 230, and port 223, and VM 214 obtains access to network 270 via port 222, network switch 240, and port 224. Network switch 230 includes profiles 231, 232, and 233 that include keys and network configuration information for corresponding VMs 211, 212, and 213, respectively, and network switch 240 includes profile 234 that includes a key and network configuration information for corresponding VM 214, as described above. Profiles 231 through 234 are created when corresponding VMs 211 through 214 are created on host processing systems 202 and 204. In a particular embodiment, a network administrator (not illustrated) creates profiles 231 through 234 when VMs 211 through 214 are created, as described above. In another embodiment, profiles 231 through 234 are automatically created by network switches 230 and 240 when VMs 211 through 214 are created, as described above.

When a particular VM 211 through 214 is migrated within a host processing system 202 or 204, network switches 230 and 240 automatically reconfigure themselves as described above in FIG. 1. When a particular VM 211 through 214 is migrated to a different host processing system 202 or 204, then network switches 230 and 240 coordinate to automatically reconfigure themselves with the proper routing information to accommodate the migration. In the illustrated example, VM 213 is migrated from host processing system 202 to host processing system 204, as indicated by dashed line 291. VM 213 is associated with profile 233 that includes a key that identifies communications to and from VM 213. The key can include a MAC address for VM 213, a WWN or IQN-id associated with VM 213, or a user defined identifier that is associated with VM 213. Before migration, network switch identifies port 221 as the appropriate route to VM 213, and all network configuration information contained in profile 233 is applied to the network port 221.

After migration, VM 213 attempts to communicate with devices or resources on network 270 via port 222. When network switch 240 receives communications with the key associated with VM 213 via port 222, network switch 240 does not recognize the key. However, if network switch 230 and network switch 240 are part of a physically stackable switch, then network switch 240 creates a new profile for VM 213, network switch 240 communicates with network switch 230 to determine if network switch 230 recognizes the key. Because the key is associated with profile 233 on network switch 230, network switch 230 recognizes the key and migrates profile 233 to network switch 240, as indicated by dashed line 292. In this way, network switch 240 recognizes that communications previously associated with VM 213 on port 121 are henceforth to be associated with VM 213 on port 122. Network switch 240 applies the port configuration information contained in profile 233 to port 222 to reflect the fact that VM 213 is now resident on host processing system 204, and that subsequent communications to and from VM 213 are to be associated with port 222.

In another embodiment (not illustrated), a primary network switch in a stackable switch includes the profiles for all virtual machines connected to the stackable switch, while one or more secondary network switches include the profiles for the virtual machines connected thereto. In this embodiment, when a new virtual machine is created on a host processing system, a new profile is created on the network switch that is connected to the host processing system, and the network switch sends a copy of the new profile to the primary network switch. When a virtual machine migrates from one host processing system to another host processing system, the network switch connected to the other host processing system requests the profile associated with the virtual machine from the primary network switch.

Figure 3:
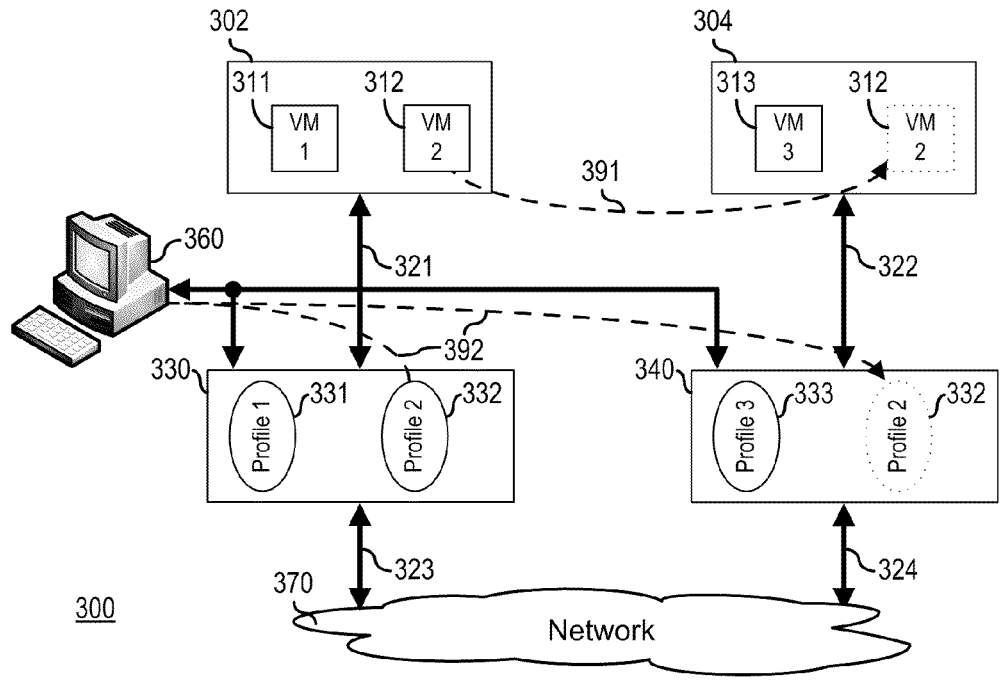
FIG. 3 is another illustration of a network system with a virtualization aware network switch.

FIG. 3 illustrates a network system 300 according to another embodiment of the present disclosure, including host processing systems 302 and 304, virtualization aware network switches 330 and 340, a profile resource manager (PRM) 360, and a network 370. Network switches 330 and 340 are separate virtualization aware switching devices that do not directly share profile information with each other. Network switches 330 and 340 can be implemented as logically separate physical switches, stackable switches, virtual switches, another type of network switch, or a combination thereof. Host processing system 302 is connected to network switch 330 by port 321 and host processing system 304 is connected to network switch 340 by port 322. Network switch 330 is connected to network 370 by port 322 and network switch 340 is connected to network 370 by port 324. PRM 360 is connected to network switch 330 and to network switch 340. Network switches 330 and 340, and their respective ports are associated with one or more network switching fabrics, and ports 321 through 324 each represent one or more data communication links between the elements connected thereto. Network 370 represents devices and resources that are available to host processing systems 302 and 304, and that are accessible through network switches 330 and 340.

Host processing system 302 includes VMs 311 and 312, and host processing system 304 includes VM 313. Host processing systems 302 and 304 can each include additional virtual machines (not illustrated). VMs 311 and 312 obtain access to network 370 via port 321, network switch 330, and port 323, and VM 313 obtains access to network 370 via port 322, network switch 340, and port 324. Network switch 330 includes profiles 331 and 332 that include keys and network configuration information for corresponding VMs 311 and 312, respectively, and network switch 340 includes profile 333 that includes a key and network configuration information for corresponding VM 313, as described above. Profiles 331 through 333 are created when corresponding VMs 311 through 313 are created on host processing systems 302 and 304. In a particular embodiment, a network administrator (not illustrated) creates profiles 331 through 333 when VMs 311 through 313 are created, as described above. In another embodiment, profiles 331 through 333 are automatically created by network switches 330 and 340 when VMs 311 through 313 are created, as described above.

Where either of network switches 330 and 340 are stackable network switches, and host processing systems 302 and 304 represent multiple host processing systems, then, when a particular virtual machine is migrated between host processing systems associated with a stackable network switch, the stackable network switch coordinates to automatically reconfigure itself as described above in FIG. 2. However, when a particular VM 311 or 312 is migrated to host processing system 304, or VM 313 is migrated to host processing system 302, PRM 360 coordinates the reconfiguration of the network switches 330 and 340 such that the associated profiles 331, 332, and 333 are migrated and reconfigured with the proper routing information to accommodate the migration. In an illustrated example, VM 312 is migrated from host processing system 302 to host processing system 304, as indicated by dashed line 391. VM 312 is associated with profile 332 that includes a key that identifies communications to and from VM 312. Before migration, profile 332 configuration parameters apply to port 321, because port 321 is the appropriate route to VM 312.

After migration, VM 312 attempts to communicate with devices or resources on network 370 via port 322. When network switch 340 receives communications with the key associated with VM 312 via port 322, network switch 340 does not recognize the key. Here, in a particular embodiment, network switch 340 communicates with PRM 360 to determine if any other network switch in the network fabric recognizes the key. Because the key is associated with profile 332 on network switch 330, PRM 360 is aware that network switch 330 recognizes the key. PRM 360 migrates profile 332 to network switch 340, as indicated by dashed line 392. Network switch 340 applies the port configuration information contained in profile 332 to port 233 to reflect the fact that VM 312 is now resident on host processing system 304, and that subsequent communications to and from VM 312 are to be associated with port 322. In another embodiment, PRM 360 includes profiles 331 through 333. In this embodiment, when VMs 311 through 313 are created, associated profiles 331 through 333 are created on appropriate network switch 330 and 340, and profiles 331 through 333 are copied to PRM 360. When VMs 311 through 313 are migrated, PRM 360 migrates the associated profiles 331 through 333 to the appropriate network switch 330 or 340.

Thus, in the illustrated embodiments, a profile resource manager does not need to be aware of the migration events between the host processing systems, but functions to migrate profiles between virtualization aware network switches in response to the migration events, that is, when communications to or from a migrated virtual machine appear on an unexpected port. In a non-limiting example, a profile resource manager can be embodied in a separate information handling system that is connected to the virtualization aware network switches, as a function residing within a virtualization aware network switch that is connected to the other virtualization aware network switches, as a function residing within a host processing system that is connected to the virtualization aware network switches, or as a combination thereof.

In another embodiment (not illustrated), a profile resource manager includes connections to the host processing systems and is aware of the migration events between the host processing systems. Here, the profile resource manager functions to migrate profiles between virtualization aware network switches concurrently with the migration events. When a VMM migrates a virtual machine from one host processing system to another, the VMM triggers the profile resource manager to migrate the associated profiles between the virtualization aware network switches. In a non-limiting example, a profile resource manager can be embodied in a separate information handling system that is connected to the host processing systems and to the virtualization aware network switches, as a function residing within a host processing system that is connected to the other host processing systems and to the virtualization aware network switches, as a function residing within a VMM, or as a combination thereof.

Figure 4:
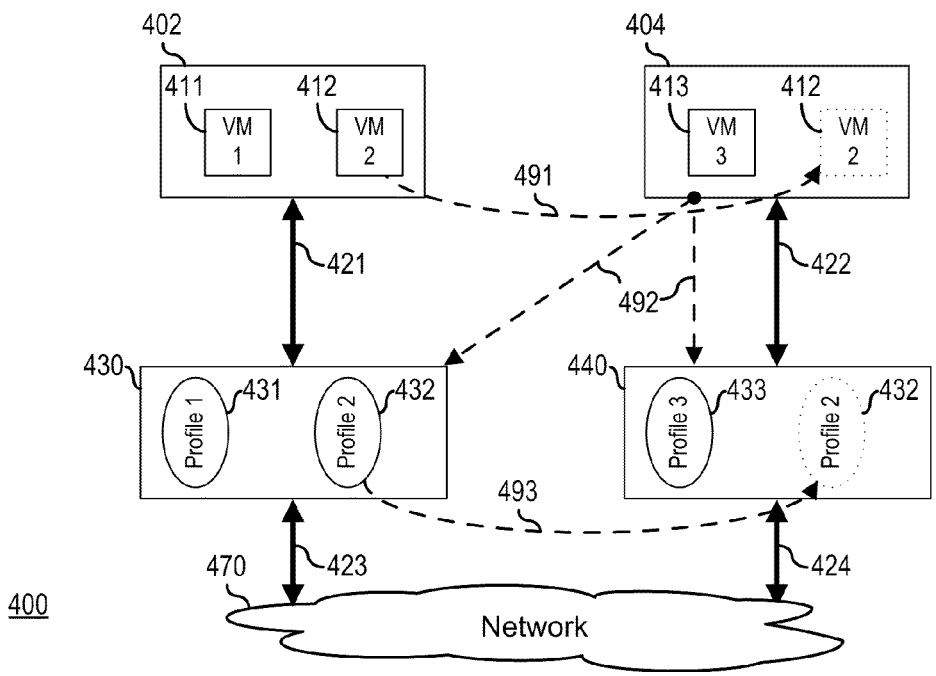
FIG. 4 is an illustration of another embodiment of a network system with a virtualization aware network switch.

FIG. 4 illustrates a network system 400 according to another embodiment of the present disclosure, including host processing systems 402 and 404, virtualization aware network switches 430 and 440, and a network 470. Network switches 430 and 440 are separate virtualization aware switching devices that do not directly share profile information with each other. Network switches 430 and 440 can be implemented as logically separate physical switches, stackable switches, virtual switches, another type of network switch, or a combination thereof. Host processing system 402 is connected to network switch 430 by port 421 and host processing system 404 is connected to network switch 440 by port 422. Network switch 430 is connected to network 470 by port 422 and network switch 440 is connected to network 470 by port 424. Network switches 430 and 440, and their respective ports are associated with one or more network switching fabrics, and ports 421 through 424 each represent one or more data communication links between the elements connected thereto. Network 470 represents devices and resources that are available to host processing systems 402 and 404, and that are accessible through network switches 430 and 440.

Host processing system 402 includes VMs 411 and 412, and host processing system 404 includes VM 413. Host processing systems 402 and 404 can each include additional virtual machines (not illustrated). VMs 411 and 412 obtain access to network 470 via port 421, network switch 430, and port 423, and VM 413 obtains access to network 470 via port 422, network switch 440, and port 424. Network switch 430 includes profiles 431 and 432 that include keys and network configuration information for corresponding VMs 411 and 412, respectively, and network switch 440 includes profile 433 that includes a key and network configuration information for corresponding VM 413, as described above. Profiles 431 through 433 are created when corresponding VMs 411 through 413 are created on host processing systems 402 and 404. In a particular embodiment, a network administrator (not illustrated) creates profiles 431 through 433 when VMs 411 through 413 are created, as described above. In another embodiment, profiles 431 through 433 are automatically created by network switches 430 and 440 when VMs 411 through 413 are created, as described above.

When a particular VM 411 or 412 is migrated to host processing system 404, or VM 413 is migrated to host processing system 402, the destination host processing system 402 or 404 coordinates the reconfiguration of the network switches 430 and 440 such that the associated profiles 431, 432, and 433 are migrated and reconfigured with the proper routing information to accommodate the migration. In the illustrated example, VM 412 is migrated from host processing system 402 to host processing system 404, as indicated by dashed line 491. Before migration, profile 432 identifies port 421 as the appropriate route to VM 412. Here, when host processing system 404 receives migrated VM 412, host processing system 404 broadcasts a register key request, indicated by dashed line 492, to network switches 430 and 440 and any other network switches in network system 400. The register key request includes the key associated with VM 412, such as a MAC address for VM 412, a WWN or IQN-id associated with VM 412, or a user defined identifier that is associated with VM 412. Each network switch 430 and 440 determines if the key matches any of the profiles 431, 432, or 433 on the network switch 430 or 440. Thus network switch 430 determines that the key in register key request matches the key in profile 432. In response, network switch 430 sends a register key reply, indicated by dashed line 493, back to host processing system 404 that includes profile 432. When network switch 440 receives the register key reply, network switch 440 migrates profile 432, and the network configuration for VM 412 is properly set-up. In a particular embodiment, when network switch 430 sends the register key reply, network switch 430 deletes profile 432. In another embodiment, network switch 430 awaits a confirmation reply (not illustrated) from network switch 440, ensuring that profile 432 is correctly received, before deleting profile 432.

Figure 5:
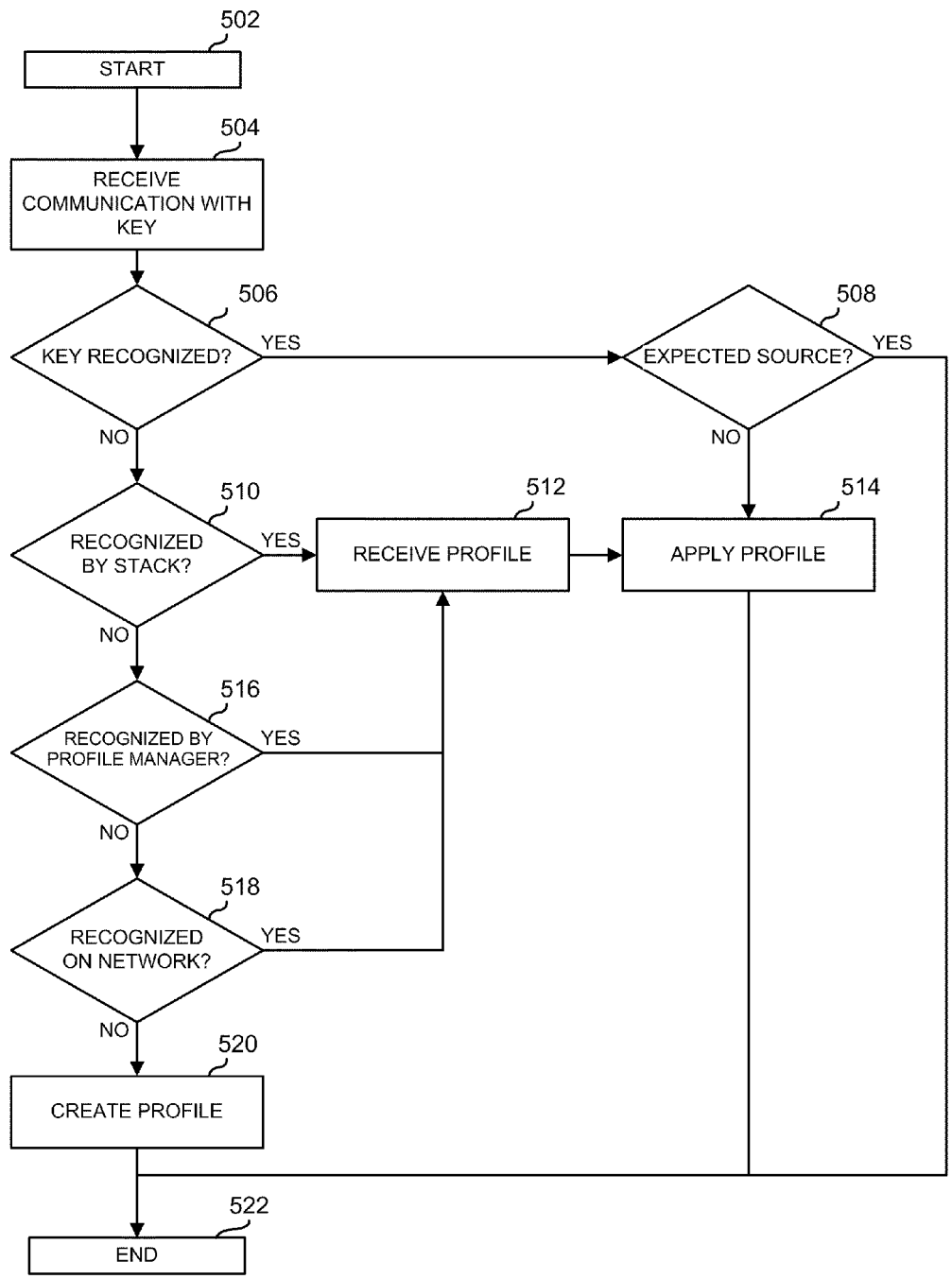
FIG. 5 is a flowchart illustrating a method of implementing a virtualization aware network switch.

FIG. 5 illustrates a method of implementing a virtualization aware network switch in a flowchart form, in accordance with an embodiment of the present disclosure. The method starts at block 502. A communication is received by a virtualization aware network switch that includes a key in block 504. For example, a virtualization aware network switch can receive a data communication from a network or a virtual machine with a key, such as a MAC address, a WWN, an IQN-id, or a user defined key that identifies a virtual machine that is associated with the data communication. A decision is made as to whether or not the virtualization aware network switch recognizes the key in decision block 506. If so, then the "YES" branch of decision block 506 is taken, implying that the virtualization aware network switch has a profile that includes the key and a decision is made as to whether or not the communication arrived at the virtualization aware network switch from an expected source in decision block 508. For example, a data communication can include a key for a virtual machine of a host system that is coupled to a particular port, as identified by a profile in the virtualization aware network switch. Thus, the data communication can arrive from the particular port, or from a different port. If the communication arrived at the virtualization aware network switch from an expected source, the "YES" branch of decision block 508 is taken and processing ends at block 522. If the communication did not arrive at the virtualization aware network switch from an expected source, the "NO" branch of decision block 508 is taken, the profile parameters are applied to the port on which the communication was received at block 514, and processing ends at block 522.

If the virtualization aware network switch does not recognize the key in decision block 506, then the "NO" branch of decision block 506 is taken, implying that the virtualization aware network switch does not have a profile that includes the key, and a decision is made as to whether or not other switches in a stackable network switch recognizes the key in decision block 510. If so, the "YES" branch of decision block 510 is taken, and the profile associated with the key is received by the virtualization aware network switch in block 512, and processing continues in block 514, where the profile parameters are applied to the port on which communication was received. If the other switches in a stackable network switch do not recognize the key, then the "NO" branch of decision block 510 is taken, implying that the stackable network switches do not have a profile that includes the key, and a decision is made as to whether or not other a profile manager recognizes the key in decision block 516. If so, the "YES" branch of decision block 516 is taken, and processing continues in block 512 where the profile associated with the key is received by the virtualization aware network switch.

If the profile manager does not recognize the key in decision block 506, then the "NO" branch of decision block 516 is taken, implying that the profile manager does not have a profile that includes the key, and a decision is made as to whether or not other switches in the network recognize the key in decision block 518. If so, the "YES" branch of decision block 518 is taken, and processing continues in block 512 where the profile associated with the key is received by the virtualization aware network switch. If the other switches in the network do not recognize the key, then the "NO" branch of decision block 518 is taken, implying that the key is associated with a newly created virtual machine, and an new profile is created on the virtualization aware network switch that associates the key with the newly created virtual machine in block 520, and processing ends in block 522.

Figure 6:
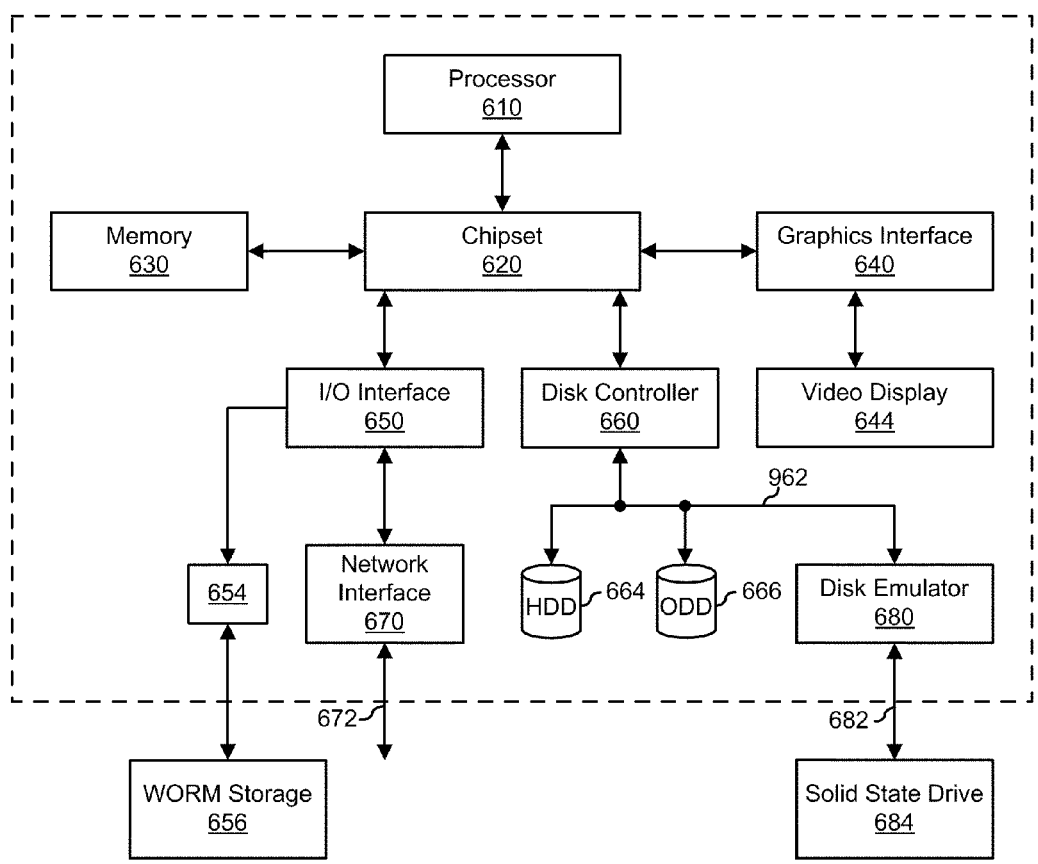
FIG. 6 is a functional block diagram illustrating an exemplary embodiment of an information handling system.

In a particular embodiment, an information handling system can be used to function as one or more of the network systems, or carry out one or more of the methods described above. In another embodiment, one or more of the systems described above can be implemented in the form of an information handling system. FIG. 6 illustrates a functional block diagram of an embodiment of an information handling system, generally designated as 600. Information handling system 600 includes processor 610, a chipset 620, a memory 630, a graphics interface 640, an input/output (I/O) interface 650, a disk controller 660, a network interface 670, and a disk emulator 680.

Processor 610 is coupled to chipset 620. Chipset 620 supports processor 610, allowing processor 610 to process machine-executable code. In a particular embodiment (not illustrated), information handling system 600 includes one or more additional processors, and chipset 620 supports the multiple processors, allowing for simultaneous processing by each of the processors, permitting the exchange of information between the processors and the other elements of information handling system 600. Processor 610 can be coupled to chipset 620 via a unique channel, or via a bus that shares information between processor 610, chipset 620, and other elements of information handling system 600.

Memory 630 is coupled to chipset 620. Memory 630 can be coupled to chipset 620 via a unique channel, or via a bus that shares information between chipset 620, memory 630, and other elements of information handling system 600. In particular, a bus can share information between processor 610, chipset 620 and memory 630. In a particular embodiment (not illustrated), processor 610 is coupled to memory 630 through a unique channel. In accordance with another aspect (not illustrated), an information handling system can include a separate memory dedicated to each of the processors. A non-limiting example of memory 630 includes static, dynamic. Or non-volatile random access memory (SRAM, DRAM, or NVRAM), read only memory (ROM), flash memory, another type of memory, or any combination thereof.

Graphics interface 640 is coupled to chipset 620. Graphics interface 640 can be coupled to chipset 620 via a unique channel, or via a bus that shares information between chipset 620, graphics interface 640, and other elements of information handling system 600. Graphics interface 640 is coupled to a video display 644. Other graphics interfaces (not illustrated) can also be used in addition to graphics interface 640 if needed or desired. Video display 644 can include one or more types of video displays, such as a flat panel display or other type of display device.

I/O interface 650 is coupled to chipset 620. I/O interface 650 can be coupled to chipset 620 via a unique channel, or via a bus that shares information between chipset 620, I/O interface 650, and other elements of information handling system 600. Other I/O interfaces (not illustrated) can also be used in addition to I/O interface 650 if needed or desired. I/O interface 650 is coupled to one or more add-on resources 654. Add-on resource 654 can also include another data storage system, a graphics interface, a network interface card (NIC), a sound/video processing card, another suitable add-on resource or any combination thereof.

Network interface device 670 is coupled to I/O interface 650. Network interface 670 can be coupled to I/O interface 650 via a unique channel, or via a bus that shares information between I/O interface 650, network interface 670, and other elements of information handling system 600. Other network interfaces (not illustrated) can also be used in addition to network interface 670 if needed or desired. Network interface 670 can be a network interface card (NIC) disposed within information handling system 600, on a main circuit board (e.g., a baseboard, a motherboard, or any combination thereof), integrated onto another component such as chipset 620, in another suitable location, or any combination thereof. Network interface 670 includes a network channel 672 that provide interfaces between information handling system 600 and other devices (not illustrated) that are external to information handling system 600. Network interface 670 can also include additional network channels (not illustrated).

Disk controller 660 is coupled to chipset 610. Disk controller 660 can be coupled to chipset 620 via a unique channel, or via a bus that shares information between chipset 620, disk controller 660, and other elements of information handling system 600. Other disk controllers (not illustrated) can also be used in addition to disk controller 660 if needed or desired. Disk controller 660 can include a disk interface 662. Disk controller 660 can be coupled to one or more disk drives via disk interface 662. Such disk drives include a hard disk drive (HDD) 664 or an optical disk drive (ODD) 666 (e.g., a Read/Write Compact Disk (R/W-CD), a Read/Write Digital Video Disk (R/W-DVD), a Read/Write mini Digital Video Disk (R/W mini-DVD), or another type of optical disk drive), or any combination thereof. Additionally, disk controller 660 can be coupled to disk emulator 680. Disk emulator 680 can permit a solid-state drive 684 to be coupled to information handling system 600 via an external interface. The external interface can include industry standard busses (e.g., USB or IEEE 1384 (Firewire)) or proprietary busses, or any combination thereof. Alternatively, solid-state drive 684 can be disposed within information handling system 600.

In the embodiments described above, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described above can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:
1. A network switch comprising:
 a first port coupled to a host system;

a second port; and
a first profile including:
    a first key that is associated with a first virtual machine on the host system; and
    first configuration information that configures the first port for the first virtual machine;
wherein the network switch is coupled to a stackable switch element;
wherein the network switch is operable to:
    receive a first communication on the second port, the first communication including the first key;
    in response to receiving the first communication, change the first configuration information to configure the second port for the first virtual machine;
    receive a second communication on the first port, the second communication including a second key that is associated with a second virtual machine on the host system;
    in response to receiving the second communication, send the second key to the stackable switch element; and
    in response to sending the second key, receive a second profile from the stackable switch element, the second profile including:
        the second key; and
        second configuration information that configures the stackable switch element for data routing of second virtual machine through the stackable switch element, and
    in response to receiving the second profile, modify network switch configuration of first port to enable data routing and network operations for second virtual machine.

2. The network switch of claim 1, the network switch is further operable to:
    receive a third communication from the stackable switch element, the third communication including the first key; and
    in response to receiving the third communication, send the first profile to the stackable switch element.

3. The network switch of claim 1, wherein further:
the network switch is coupled to a profile manager; and
the network switch is further operable to:
    send the first profile to the profile manager;
    receive a third communication on the first port, the third communication including a third key that is associated with a third virtual machine on the host system;
    in response to receiving the third communication, send the third key to the profile manager; and
    in response to sending the third key, receive a third profile from the profile manager, the third profile including:
        the third key; and
        third configuration information that configures the first port to enable data routing for the third virtual machine.

4. The network switch of claim 1, wherein further:
the network switch is coupled to a network; and
the network switch is further operable to:
    receive a first request from a first source device on the network, the first request including the first key; and
    in response to receiving the first request, send a first reply to the first source device, the first reply including the first profile.

5. The network switch of claim 4, wherein further:
the network switch is coupled to a second source device; and
the network switch further operable to:
    receive a second request from the second source device, the second request including a third key that is associated with the second source device; and
    receive a third profile from the network, the third profile including:
        the third key; and
        third configuration information that configures the network switch to enable data routing for the second source device through the network switch.

6. The network switch of claim 5, wherein the first key includes a media access control address.

7. The network switch of claim 1, wherein the first configuration information comprises a virtual local area network (VLAN) identifier associated with the first virtual machine.

8. The network switch of claim 1, wherein the first configuration information comprises a network access control list (ACL) associated with the first virtual machine.

9. The network switch of claim 1, wherein the first key information includes one of a media access control (MAC) address associated with the first virtual machine, a worldwide name (WWN) associated with the first virtual machine, and an iSCSI qualified name (IQN) associated with the first virtual machine.

10. A method comprising:
    coupling a host system to a first port of a first network switch, the host system including a first virtual machine;
    receiving at the first port a first communication from the first virtual machine;
    in response to receiving the first communication, creating in the first network switch a first profile including:
        first key information operable to identify data received by the first network switch as being associated with the first virtual machine; and
        first configuration information operable to configure the first network switch to route data associated with the first virtual machine through the first port;
    receiving at a second port of the first network switch a second communication that includes the first key information;
    in response to receiving the second communication, modifying the network switch configuration as per the first configuration information to enable data routing for the first virtual machine through the second port;
    coupling the first network switch to a second network switch;
    receiving at the first network switch a third communication from the second network switch, the third communication including the first key information;
    in response to receiving the third communication, sending the first profile to the second network switch;
    receiving at the first port a fourth communication that includes second key information operable to identify data received by the first network switch as being associated with a second virtual machine on the host system;
    in response to receiving the fourth communication, sending the second key information to the second network switch;
    in response to sending the second key information, receiving a second profile from the second network switch, the second profile including:
        the second key information; and
        second configuration information operable to configure the second network switch to enable data routing for the second virtual machine through the second network switch; and in response to receiving the second profile, applying the second profile such that the second configuration information configures the first network switch to route data associated with the second virtual machine through the first port.

11. The method of claim 10, further comprising:
coupling the first network switch to a profile manager;
sending the first profile to the profile manager;
receiving at the first port a fourth communication that includes third key information operable to identify data received by the first network switch as being associated with a third virtual machine on the host system;
in response to receiving the fourth communication, sending the third key information to the profile manager; and
in response to sending the third key information, receiving a third profile from the profile manager, the third profile including:
the third key information; and
third configuration information operable to configure the first network switch to enable data routing for the third virtual machine through the first port.

12. The method of claim 10, further comprising:
coupling the first network switch to a network;
receiving a first request from a first source device on the network, the first request including the first key information; and
in response to receiving the first request, sending a first reply to the first source device, the first reply including the first profile.

13. The method of claim 12, further comprising:
coupling the network switch to a second source device;
receiving a second request from the second source device, the second request third key information operable to identify data received by the first network switch as being associated with the second source device; and
receiving a third profile from the network, the third profile including:
the third key information; and
third configuration information that configures the first network switch to enable data routing for the second source device through the first network switch.

14. The method of claim 10, wherein the first configuration information comprises a virtual local area network (VLAN) identifier associated with the first virtual machine.

15. The method of claim 10, wherein the first key information includes one of a media access control (MAC) address associated with the first virtual machine, a world-wide name (WWN) associated with the first virtual machine, and an iSCSI qualified name (IQN) associated with the first virtual machine.

16. Machine-executable code for an information handling system having a first resource, wherein the machine-executable code is embedded within a non-transitory medium and includes instructions for carrying out a method comprising:
receiving at a first port of a first network switch a first communication from a first virtual machine;
in response to receiving the first communication, creating in the first network switch a first profile including:
first key information operable to identify data received by the first network switch as being associated with the first virtual machine; and
first configuration information operable to configure the first network switch to enable data routing for the first virtual machine through the first port;
receiving at a second port of the first network switch a second communication that includes the first key information; and
in response to receiving the second communication, applying the first configuration information to configure the first network switch to enable data routing for the first virtual machine through the second port;
receiving at the first network switch a third communication from a second network switch, the third communication including the first key information;
in response to receiving the third communication, sending the first profile to the second network switch;
receiving at the first port a fourth communication that includes second key information operable to identify data received by the first network switch as being associated with a second virtual machine on the host system;
in response to receiving the fourth communication, sending the second key information to the second network switch;
in response to sending the second key information, receiving a second profile from the second network switch, the second profile including:
the second key information; and
second configuration information operable to configure the second network switch to enable data routing for the second virtual machine through the second network switch; and
in response to receiving the second profile, applying the second profile such that the second configuration information configures the first network switch to route data associated with the second virtual machine through the first port.

17. The machine-executable code of claim 16, the method further comprising:
coupling the first network switch to a profile manager;
sending the first profile to the profile manager;
receiving at the first port a fifth communication that includes third key information operable to identify data received by the first network switch as being associated with a third virtual machine on the host system;
in response to receiving the fifth communication, sending the third key information to the profile manager; and
in response to sending the third key information, receiving a third profile from the profile manager, the third profile including:
the third key information; and
third configuration information operable to configure the first network switch to enable data routing for the third virtual machine through the first port.

18. The machine-executable code of claim 16, the method further comprising:
coupling the first network switch to a network;
receiving a first request from a first source device on the network, the first request including the first key information; and
in response to receiving the first request, sending a first reply to the first source device, the first reply including the first profile.

19. The machine-executable code of claim 16, wherein the first configuration information comprises a network access control list (ACL) associated with the first virtual machine.

20. The machine-executable code of claim 16, wherein the first key information includes one of a media access control (MAC) address associated with the first virtual machine, a world-wide name (WWN) associated with the first virtual machine, and an iSCSI qualified name (IQN) associated with the first virtual machine.

* * * * *